S. H. KEEFER.
SYSTEM OF MOTOR CONTROL.
APPLICATION FILED MAY 29, 1911.
1,170,974.
Patented Feb. 8, 1916.
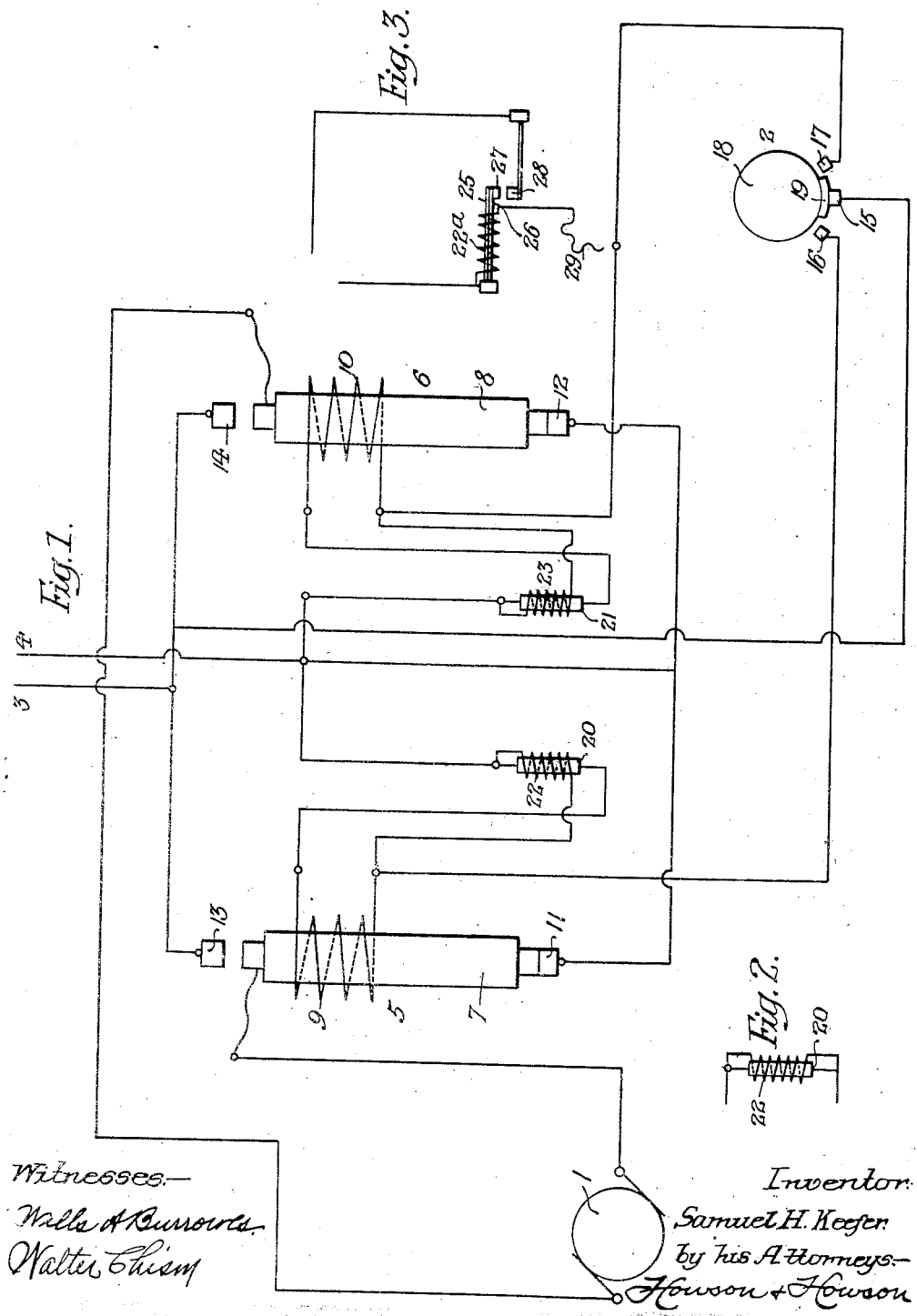

UNITED STATES PATENT OFFICE.

SAMUEL H. KEEFER, OF PLAINFIELD, NEW JERSEY, ASSIGNOR TO NILES-BEMENT-POND COMPANY, OF JERSEY CITY, NEW JERSEY, A CORPORATION OF NEW JERSEY.

SYSTEM OF MOTOR CONTROL.

1,170,974.  Specification of Letters Patent.  Patented Feb. 8, 1916.

Application filed May 29, 1911.  Serial No. 630,031.

*To all whom it may concern:*

Be it known that I, SAMUEL HINE KEEFER, a citizen of the United States, and a resident of Plainfield, county of Union, State of New Jersey, have invented certain Improvements in Systems of Motor Control, of which the following is a specification.

The present invention has for an object the provision of a simple and efficient apparatus, useful in switching devices generally, but particularly designed to control the supply of current to a reversing motor whereby it shall be impossible for the current to flow from the supply mains to the armature of the motor for a predetermined time after the motor circuit has been closed; it being especially desired to provide means particularly adapted for use in connection with systems which include a motor-reversing switch having a controlling pilot switch.

Another object of the invention is to provide temperature dependent means for preventing the operation of an electromagnetic switch immediately after the circuit to its controlling magnet or magnets has been completed; the apparatus being primarily so arranged as to prevent the cutting off and subsequent immediate reversal of the current in the armature circuit of a motor properly connected thereto.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the drawings, in which are illustrated diagrammatically one or more various possible embodiments of the several features of the invention, Figure 1 shows one application of the invention to a system of motor control; Fig. 2 illustrates a modified form of one of the devices shown in Fig. 1; and Fig. 3 illustrates a further modification of the temperature-dependent device and some of its associated circuits.

Similar reference characters refer to similar parts throughout the several views of the drawings.

Referring now more particularly to Fig. 1, there is shown at 1 the armature of a motor to which the flow of current is to be controlled and at 2 a pilot switch, it being understood that the motor is of the reversing type and has a constantly excited field winding which is omitted from the drawings for the sake of clearness. The current supply mains are indicated at 3 and 4 and for controlling the direction of current flow in the motor armature, there are provided two electromagnets 5 and 6 usually of the solenoid type, having longitudinally movable cores indicated respectively at 7 and 8 and provided with actuating windings 9 and 10. When in their lower positions the movable members or cores 7 and 8 engage contacts 11 and 12 respectively, both of which are permanently in connection with the current supply main 4, while said cores themselves are likewise permanently connected to the two terminals of the armature 1. When in their raised positions under the action of the windings 9 and 10, said cores engage respectively with a pair of contacts 13 and 14, both of which are connected to the current supply main 3. The pilot switch 2 includes a central fixed contact 15, connected to the current supply main 3, and two other fixed members 16 and 17 on opposite sides of said contact 15, there being a movable structure 18 carrying a contact 19 capable of electrically connecting the central contact 15 with either of the side contacts 16 and 17. Of these latter the contact 16 is connected to one end of the winding 9 while the contact 17 is connected to one end of the winding 10. The second end of the winding 9 is connected to the current supply main 4 through a body 20 which when cold is practically an insulator but which when heated to a predetermined degree is a good conductor of electricity. Similarly a second body 21 of this same material is connected between the second end of the winding 10 and the current supply main 4; it being understood that these two bodies 20 and 21 will be made of suitable dimensions and form to suit any desired conditions and may likewise be made of any of a number of well known materials capable of substantially preventing current flow when cold and permitting it when heated. The body 20 is provided with a heating coil 22 connected between the current supply main 4 and that end of the winding 9 connected to the contact 16, and similarly the body 21 has a heating coil 23 connected between this same current supply main and that end of the coil 10 in connection with the contact 17. With this particular arrangement of parts, operation of the pilot switch to bring the contact 19 into engagement with the two contacts 15 and 16, permits current to flow from the supply main 3 through said contacts 15, 19 and 16 and through the heating coil 22 to the current supply main 4; there being little or no flow through the winding 9 owing to the high resistance of the body 20. Within a predetermined time, however, the body 20 has its conductivity so raised by the heat provided by the coil 22, that it permits enough current to flow through the winding 9 to cause said winding to raise its core 7 and bring the latter into engagement with the contact 13. As a consequence, current will flow from the supply main 3, through the contact 13 to the core 7, thence through the motor armature 1, core 8, and contact 12, to the supply main 4. The motor will thus be started and operate in the well known manner; it being obvious that any desired starting or controlling mechanism may be used in connection with the apparatus heretofore described without in any way departing from or modifying my invention.

If while the armature is revolving under the action of current flowing as above described, the pilot switch 2 be so operated as to bring its contact 19 into the position shown in the drawings, the said armature is short circuited and is speedily brought to rest under the action of the dynamic current which it generates. A movement of the pilot switch such as brings the contact 19 into engagement with the contacts 15 and 17 not only cuts off current from the winding 9 and heating coil 22, but supplies current to the heating coil 23. This latter, however, is so designed that by the time the body 21 is sufficiently heated to permit an actuating current to flow through the winding 10, the rotation of the armature will have been stopped owing to the short circuiting action above noted. Thereafter owing to the effect of said coil upon the body 21, current is free to flow from the current supply main 3 through the contacts 15, 19 and 17, the coil 10 and said body 21 to the supply main 4, thus raising the core 8 into engagement with the contact 14. Current therefore flows from the current supply main 3 through the contact 14, core 8, to the armature 1, thence to the core 7, contact 11 and to current supply main 4. Since such flow is in a direction opposite to that previously noted, the direction of rotation of the armature 1 is reversed and it is obvious that by means of the thermostatic device described, it is not possible to reverse the current flow in the armature soon enough after it has been cut off to cause injury to the motor, the bodies 20 and 21 being so designed as to radiate heat with sufficient rapidity to attain the end desired even though the pilot switch be maliciously or carelessly operated from one position to the other with the greatest rapidity.

If desired the temperature dependent devices may be connected as shown in Fig. 2; that is to say, the heating coils may be arranged in multiple with the body 20, and with this latter, be connected in series with the winding 9, instead of being connected as shown in Fig. 1, in multiple to said winding and the body 20 connected in series. In such case the current flowing through the heating coil forms part of the current energizing the winding 9 or 10 as the case may be.

If desired the same end as that hitherto described may be attained by the use of a thermostatic switch as shown in Fig. 3, in which a movable switch element is provided by a pair of bars 25 and 26 of materials having different co-efficients of expansion and carrying a contact 27 placed to coöperate with a fixed contact 28. Said contact 27 is electrically connected to one of the current supply mains 4 and as before, a heating coil 22$^a$ is provided, having one end connected to said supply main 4 and its second end 29 connected to the contact 16 or 17, as the case may be, of the pilot switch. With this arrangement of parts, the operation of said pilot switch to one of its working positions causes current to flow through the heating coil 22$^a$ and so affects the bars 25 and 26 that they coöperate to cause such movement of the contact 27 as brings this latter into engagement with the contact 28. Current is then free to flow from the current supply main 4 to which said contact 27 is connected through that one of the coils of the reversing switch to which the contact 28 happens to be connected, it being understood that each of said coils has one of said devices in circuit with it as shown in Fig. 1. This device, as before, prevents the current being delivered to the armature of the motor until after the lapse of a predetermined time which is of sufficient duration to give the armature 1 time to come to rest (if it had previously been operating under current) and thereby prevent injury to the motor by preventing its receiving current while still rotating in the original direction.

It will be observed that in the cases illustrated current is prevented from flowing to the electromagnets of the reversing switch until the heating coil has so acted on the bodies 20 or 21 or on the bars 25 and 26 as to permit such flow; said bodies and bars with the contact 28 both constituting in effect switches whose operation is influenced by a heating coil.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In an electrical system, in combination, a motor, reversing means therefor comprising a winding and a pilot-switch, and means comprising a substance the electrical resistance of which is influenced by temperature connected to prevent the passage of an operative current through said winding during an interval of time after the actuation of said pilot-switch.

2. In an electrical system, in combination, a motor, reversing means therefor comprising an electro-magnetic device and a piloting switch, means comprising a substance the electrical conductivity of which is influenced by temperature for retarding the operation of said reversing means, and an electrical circuit under control of said pilot-switch for causing temperature changes in said substance.

3. In an electrical system, in combination, a motor, reversing means therefor, and electrical means independent of the motor adapted to retard the operation of said first means.

4. In an electrical system, in combination, a motor, reversing switches therefor, solenoids adapted to actuate said switches, a pilot switch, and electrical means independent of the motor adapted to prevent the passage of an operative current through either of said solenoids during an interval of time after the operation of the pilot switch.

5. In an electrical system, in combination, a motor, reversing means therefor comprising two windings, a pilot switch adapted to close a circuit including one or the other of said windings at will, each of said windings having in circuit with it a body of material substantially an insulator at normal temperatures and a conductor at elevated temperatures, and a heating coil for each of said bodies of material connected in shunt to the same.

6. In an electrical system, in combination, a motor, an electro-magnetic reversing switch therefor comprising two movable members respectively connected to the terminals of one of the motor windings, a winding for each of said members adapted to actuate the same, contacts normally engaged by said members when the windings are deënergized and connected to one of the current supply mains, other contacts adapted to be engaged respectively by the movable members when said windings are energized, said other contacts being connected to another current supply main, a pilot switch in circuit with both of said windings, and a device, the electrical conductivity of which is influenced by temperature associated with each winding for preventing the flow of an energizing current thereto for an interval of time after the pilot switch has been moved to a position to supply current to the respective windings.

In testimony whereof, I have signed my name to this specification, in the presence of two subscribing witnesses.

SAMUEL H. KEEFER.

Witnesses:
WILLIAM E. BRADLEY,
WM. A. BARR.